(12) United States Patent
McWilliams

(10) Patent No.: US 8,082,922 B2
(45) Date of Patent: Dec. 27, 2011

(54) HEAD-UP DISPLAY UNIT

(75) Inventor: Robin McWilliams, Tyne & Wear (GB)

(73) Assignee: Draeger Safety UK Limited, Blyth, Northumberland (GB)

(*) Notice: Subject to any disclaimer, the term of this patent is extended or adjusted under 35 U.S.C. 154(b) by 960 days.

(21) Appl. No.: 11/962,694

(22) Filed: Dec. 21, 2007

(65) Prior Publication Data

US 2008/0185001 A1  Aug. 7, 2008

(30) Foreign Application Priority Data

Jan. 31, 2007 (GB) .................................. 0701863.3

(51) Int. Cl.
*A62D 7/00* (2006.01)
*A61M 16/22* (2006.01)

(52) U.S. Cl. ......... 128/205.25; 128/201.23; 128/205.23; 128/205.28; 128/206.21; 128/206.28

(58) Field of Classification Search ............. 128/200.24, 128/201.19, 201.25, 201.27, 201.29, 202.22, 128/202.27, 204.18, 204.23, 205.22, 205.23, 128/205.25, 206.21, 206.27, 206.28
See application file for complete search history.

(56) References Cited

U.S. PATENT DOCUMENTS

| | | | | |
|---|---|---|---|---|
| 5,191,317 A | * | 3/1993 | Toth et al. ...................... | 340/626 |
| 5,492,110 A | * | 2/1996 | Lenz et al. ................ | 128/202.22 |
| 5,697,099 A | * | 12/1997 | Siska et al. ............................ | 2/5 |
| 6,199,550 B1 | * | 3/2001 | Wiesmann et al. ....... | 128/204.23 |
| 6,240,921 B1 | * | 6/2001 | Brydon et al. ............ | 128/205.23 |
| 6,325,521 B1 | * | 12/2001 | Gregg et al. ................... | 362/106 |
| 6,995,665 B2 | * | 2/2006 | Appelt et al. .................. | 340/521 |
| 2002/0176323 A1 | * | 11/2002 | Magine et al. ................ | 367/134 |
| 2002/0186177 A1 | * | 12/2002 | Hong et al. ........................ | 345/7 |
| 2004/0046710 A1 | * | 3/2004 | Adams et al. ...................... | 345/8 |
| 2004/0163648 A1 | * | 8/2004 | Burton ..................... | 128/204.21 |

* cited by examiner

Primary Examiner — Justine Yu
Assistant Examiner — Clinton T Ostrup
(74) Attorney, Agent, or Firm — DLA Piper LLP (US)

(57) ABSTRACT

A head-up display unit 10 comprises a microprocessor 30 which controls four light-emitting diodes (LEDs) which constitute the head-up display 20. The microprocessor 30 and LEDs 20 are powered by a battery 40 and a switch 50 is in series with the battery. A temporary store 60 in the form of a capacitor is in parallel with the battery 40 after the switch 50. A data receiver 32 is connected to the microprocessor 30 and communicates received data 34 to the microprocessor 30. The head-up display unit 10 is located in the face-mask 100 of a self contained breathing apparatus unit. The LEDs 20 are located in the periphery of the viewable region of the face-mask 100 so that they can be seen by the user when the face-mask is worn. The switch 50 comprises two conductive rubber strips which conduct current between them when sufficient pressure is applied. The switch 50 is located on a portion of the face-mask seal 102 such that when the face-mask 100 is worn i.e. held against the face of the wearer, the rubber strips conduct current between them and when the face-mask is not being worn the rubber strips do not conduct. The switch 50 is embedded in the face-mask seal 102 in such a way that a tight seal between the user and the face-mask 100 is still achieved when the face-mask is worn.

12 Claims, 2 Drawing Sheets

HEAD-UP DISPLAY UNIT

BACKGROUND OF THE INVENTION

The present invention relates to a head-up display unit for use with the face-mask of a self-contained breathing apparatus (SCBA) unit.

Self-contained breathing apparatuses typically comprise a harness, on which is mounted a cylinder of breathable gas under high pressure. The gas is reduced in pressure to a medium pressure at a first stage regulator on leaving the cylinder after which it travels through a hose to a second stage regulator, attached to a face-mask worn by the user. The second-stage regulator reduces the pressure of the gas to a pressure slightly above atmospheric.

It is known to have a head-up display unit in the face-mask that displays to the user the pressure in the gas cylinder. A battery located in the face-mask may power the display unit. For ease of operation it is important that the operation of the head-up display unit is automatic.

A known head-up display unit has two modes, SLEEP and ON. When the unit detects a signal relating to the gas pressure the unit enters the ON mode and the gas pressure is displayed by the unit. If a signal is not detected for a predetermined period of time then the unit enters SLEEP mode. The unit is still powered in this mode but the power consumption is much less. The problem with a unit of this type is that even when it is not being used power is consumed.

SUMMARY OF THE INVENTION

According to the invention there is provided a head-up display device for use with a face-mask of a breathing apparatus comprising: a switch located on a portion of the face mask arranged such that when the mask is donned by a user the switch closes causing power from a power-supply to be supplied to the unit, and when the mask is removed the switch is opened causing the power-supply to be disconnected from the unit; and, a temporary power storage device which is charged when the switch is closed and which powers the processor and display means when the switch is opened.

In one embodiment the temporary power storage device comprises a capacitor. The switch may comprise two conductive rubber strips which conduct current between them when sufficient pressure is applied.

The head-up display comprises display means for indicating one or more conditions relating to data, and electronic processor means for processing data.

The display means comprises at least one LED. Alternatively, or in addition, the display means may include an LCD display.

The power-supply is a battery located within the face mask.

The head-up display device may further include a receiver for wirelessly receiving the data and transmitting it to the processor. The receiver may be an induction receiver.

The data may relate to the pressure of breathable gas in a cylinder of pressurized gas attached to the breathing apparatus.

BRIEF DESCRIPTION OF THE DRAWING

An embodiment of the present invention will now be described, by way of example, with reference to the accompanying drawings, in which.

DESCRIPTION OF AN EMBODIMENT OF THE INVENTION

Figure 1:
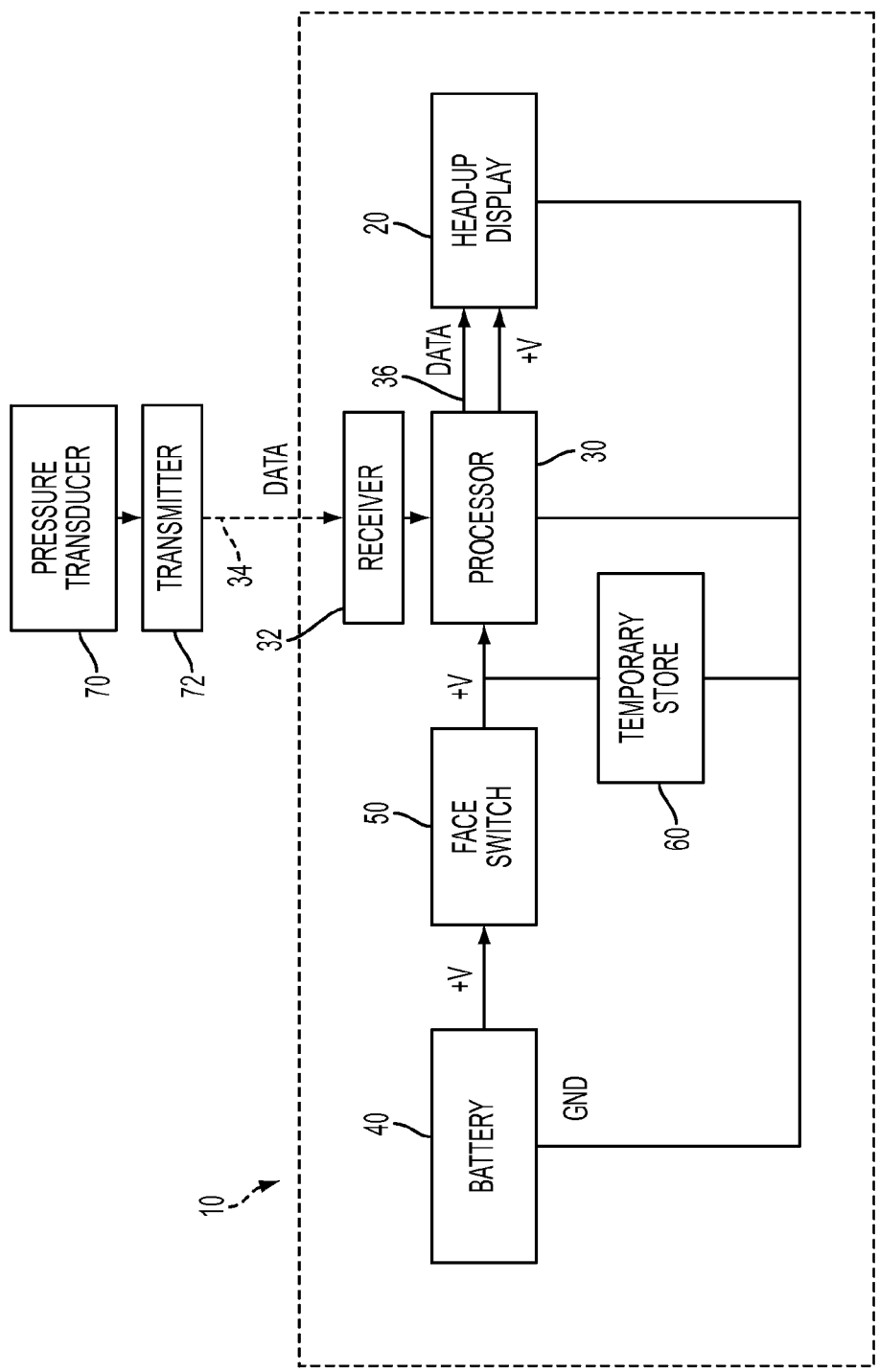
FIG. 1 is a schematic diagram of a head-up display unit according to an embodiment of the invention.
Figure 2:
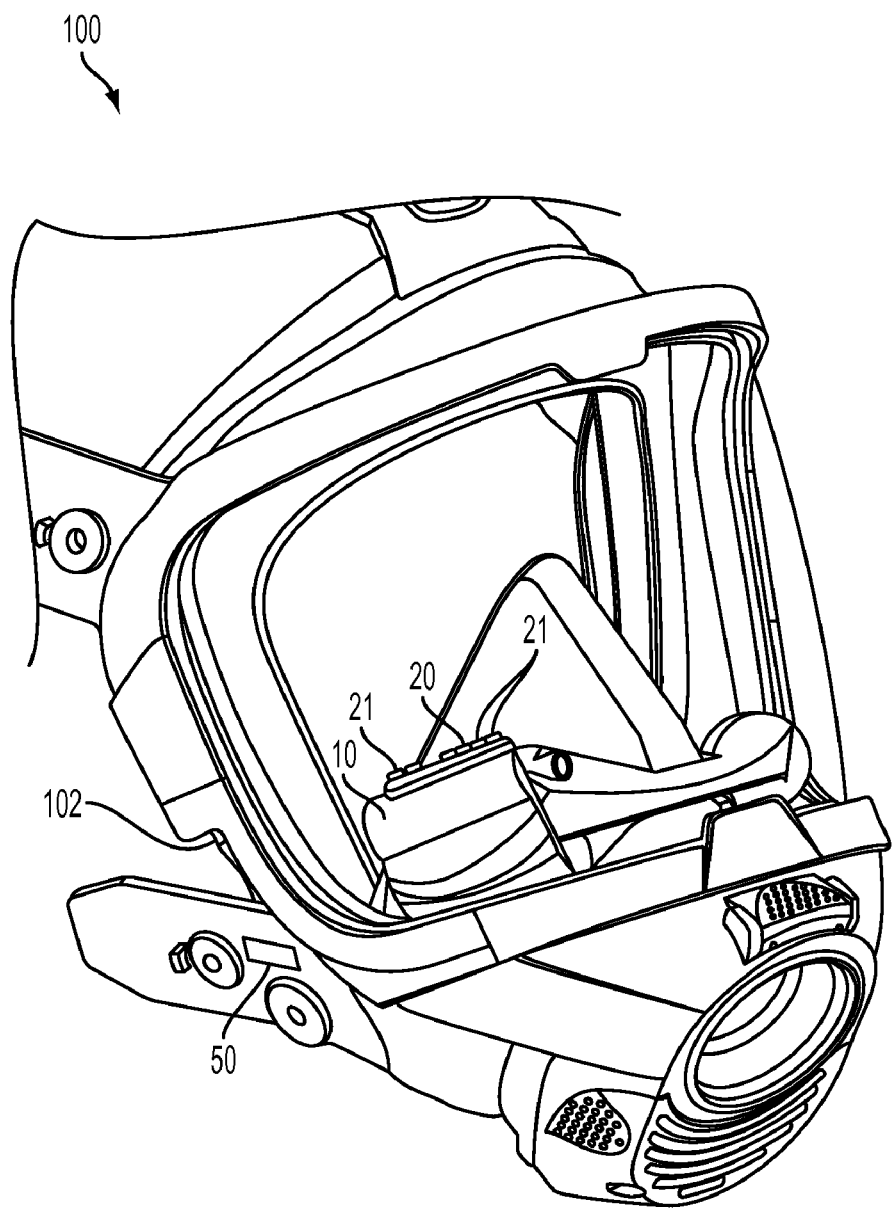
FIG. 2 shows a face-mask having a head-up display unit according to an embodiment of the invention installed.

Referring to FIG. 1 a head-up display unit 10 comprises a microprocessor 30 which controls four light-emitting diodes (LEDs) which constitute a head-up display 20. The microprocessor 30 and LEDs 21 are powered by a battery 40. A switch is in series with the battery 40. A temporary store or power storage device 60 in the form of a capacitor is in parallel with the battery 40 after the switch. A data receiver 32 is connected to the microprocessor 30 and communicates received data 34 to the microprocessor 30. The head-up display unit 10 is located in a face-mask 100 of a self contained breathing apparatus unit, as shown in FIG. 2. The LEDs 21 are located in the periphery of the viewable region of the face-mask 100 so that they can be seen by the user when the face-mask 100 is worn.

The switch comprises two conductive rubber strips 50 which conduct current between them when sufficient pressure is applied. The switch is located on a portion of a face-mask seal 102 such that when the face-mask 100 is worn i.e. held against the face of the wearer, the rubber strips 50 conduct current between them and when the face-mask is not being worn the rubber strips 50 do not conduct. The switch is embedded in the face-mask seal 102 in such a way that a tight seal between the user and the face-mask 100 is still achieved when the face-mask 100 is worn.

In use the face-mask 100 is worn by a user. This causes sufficient pressure to be applied to the conductive rubber strips 50 of the switch and hence the conductive rubber strips 50 conduct current between them. By closing the switch the microprocessor 30 and four LEDs 21 are powered by the battery 40. The battery 40 also charges the capacitor 60.

A data transmitter 72 is connected to a pressure transducer 70 that is attached to a reducer of the harness of a self-contained breathing apparatus unit. When in use a cylinder of breathable gas is attached to the reducer and thus the data transmitter 72 transmits the pressure of the gas cylinder to the data receiver 32. The data receiver 32 is an induction receiver and the data transmitter 72 is an induction transmitter. The transmitter 72 and receiver 32 therefore communicate wirelessly.

When the microprocessor 30 and LEDs 21 are powered the receiver 32 receives data 34 relating to the pressure of the gas cylinder from the transmitter 72. This data 34 is processed by the microprocessor 30 and the processed data 36 is transmitted to the four LEDs 21. The four LEDs 21 indicate to the user whether the gas cylinder is near full, near three-quarters full, near half full, near a quarter-full or near empty.

If the switch is opened by either repositioning the face-mask 100 or actually removing it the battery 40 is disconnected from the microprocessor 30 and LEDs 21. However, the capacitor 60 continues to power the microprocessor 30 and LEDs 21 for approximately one minute after the battery 40 has been disconnected. This means that if the face-mask 100 is repositioned by the user then the head-display unit is not immediately switched off and the data connection with the pressure transducer 70 is not lost.

While an embodiment of the invention has been disclosed, the scope of the invention is not so limited to the disclosed embodiment. Rather, various alternative features and components may be included, added or substituted without departing from the spirit and scope of the invention which is to be limited only by the following claims and equivalents thereof.

The invention claimed is:

1. A face-mask for a breathing apparatus, a head-up display device located in the face-mask, the head-up display device comprising:
   a switch located on a portion of the face-mask and arranged to be closed when the mask is donned by a user; such that when the mask is donned by the user the switch closes causing power from a power-supply to be supplied to the device, and when the mask is removed the switch opens causing the power-supply to be disconnected from the device; and,
   a temporary power storage device which is arranged to be charged by the power supply when the switch is closed and which powers the unit when the switch is opened.

2. A face-mask according to claim 1, wherein the switch is arranged to be closed by pressure when the mask is donned by the user.

3. A face-mask according to claim 1, wherein the temporary power storage device comprises a capacitor.

4. A face-mask according to claim 1, wherein the head-up display device comprises a display means for indicating one or more conditions relating to data.

5. A face-mask according to claim 4, wherein the display means includes at least one LED.

6. A face-mask according to claim 4, wherein the display element comprises an LED display.

7. A face-mask according to claim 4, wherein the data displayed by the display means relates to the pressure in a cylinder of pressurised gas.

8. A face-mask according to claim 1, including an electronic processor means for processing data.

9. A face-mask according to claim 8, further including a receiver for wirelessly receiving data and transmitting it to the processor.

10. A face-mask according to claim 9, wherein the receiver is an inductive receiver.

11. A face-mask according to claim 1, wherein the switch comprises conductive rubber strips which conduct current between them when sufficient pressure is applied to at least one strip.

12. A face-mask according to claim 1, wherein the power-supply is a battery located within the device.

* * * * *